United States Patent
Miyoshi et al.

(10) Patent No.: US 7,155,170 B2
(45) Date of Patent: Dec. 26, 2006

(54) COMMUNICATION TERMINAL APPARATUS, BASE STATION APPARATUS, AND RADIO COMMUNICATION METHOD

(75) Inventors: Kenichi Miyoshi, Yokohama (JP); Osamu Kato, Yokosuka (JP); Atsushi Sumasu, Yokosuka (JP); Isamu Yoshii, Yokosuka (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/304,537

(22) Filed: Dec. 16, 2005

(65) Prior Publication Data

US 2006/0094367 A1    May 4, 2006

Related U.S. Application Data

(63) Continuation of application No. 10/110,942, filed on Jul. 17, 2002, now Pat. No. 7,006,798.

(51) Int. Cl.
*H04B 17/00* (2006.01)

(52) U.S. Cl. .................... 455/67.11; 455/69; 455/63.1; 455/509; 455/450; 455/452.2; 455/67.13; 455/561; 370/315; 370/329; 370/342; 370/335; 370/330; 375/211; 375/267; 375/347

(58) Field of Classification Search ........... 455/67.11, 455/69, 101, 63.1, 450, 440, 67.13, 452.2, 455/509, 561; 370/329, 342, 315
See application file for complete search history.

(56) References Cited

U.S. PATENT DOCUMENTS

| | | | |
|---|---|---|---|
| 5,436,906 A | | 7/1995 | Kasuya et al. |
| 5,649,290 A | * | 7/1997 | Wang .................... 370/332 |
| 5,752,166 A | | 5/1998 | Dorenbosch et al. |
| 5,794,129 A | * | 8/1998 | Komatsu ................... 455/69 |
| 5,859,875 A | * | 1/1999 | Kato et al. ............... 375/267 |
| 6,011,971 A | * | 1/2000 | Jolma ....................... 455/438 |
| 6,028,845 A | | 2/2000 | Serikawa et al. |
| 6,064,678 A | | 5/2000 | Sindhushayana et al. |
| 6,081,727 A | * | 6/2000 | Kondo ...................... 455/522 |
| 6,084,886 A | | 7/2000 | Dehner et al. |
| 6,185,266 B1 | * | 2/2001 | Kuchi et al. ............. 375/347 |
| 6,229,795 B1 | * | 5/2001 | Pankaj et al. ............ 370/329 |
| 6,307,849 B1 | * | 10/2001 | Tiedemann, Jr. ......... 370/335 |

(Continued)

FOREIGN PATENT DOCUMENTS

CN            1046394         11/1999

(Continued)

OTHER PUBLICATIONS

International Search Report dated Nov. 20, 2001.

(Continued)

*Primary Examiner*—Marceau Milord
(74) *Attorney, Agent, or Firm*—Stevens, Davis, Miller & Mosher, LLP

(57) ABSTRACT

A retransmission request signal creation section (119) outputs an ACK signal or NACK signal to a NACK signal counting section (120) based on the result of error detection by an error detection section (118), the NACK signal counting section (120) counts, for each communication mode, the number of NACK signals output (that is, the number of data retransmissions) before an ACK signal is output from the retransmission request signal creation section (119), and a table rewriting section (121) compares the number of retransmissions counted by the NACK signal counting section (120) with a predetermined threshold value for the number of retransmissions, and rewrites the contents of a communication mode table (102) based on the result of this comparison.

8 Claims, 14 Drawing Sheets

U.S. PATENT DOCUMENTS 6,307,867 B1 * 10/2001 Roobol et al. .............. 370/470
6,393,012 B1 * 5/2002 Pankaj ...................... 370/342
6,430,417 B1    8/2002 Raith et al.
6,580,919 B1 * 6/2003 Saito ......................... 455/522
7,006,798 B1 * 2/2006 Miyoshi et al. ........... 455/67.11

FOREIGN PATENT DOCUMENTS

| CN | 1130944 | 12/2003 |
|---|---|---|
| EP | 0986282 | 3/2000 |
| JP | 06244791 | 9/1994 |
| JP | 2000 101680 | 4/2000 |
| JP | 2000 217144 | 8/2000 |

OTHER PUBLICATIONS

"CDMA2000 High Rate Packet Data Air Interface Specification," Ballot Resolution Version, 3GPP2, Sep. 12, 2000.

* cited by examiner

| CIR | COMMUNICATION MODE |
|---|---|
| $0 \leq CIR < A[dB]$ | BPSK |
| $A[dB] \leq CIR < B[dB]$ | QPSK |
| $B[dB] \leq CIR < C[dB]$ | 16QAM |
| $C[dB] \leq CIR$ | 64QAM |

FIG.2

COMMUNICATION TERMINAL APPARATUS, BASE STATION APPARATUS, AND RADIO COMMUNICATION METHOD

This is a Continuation application of Ser. No. 10/110,942 filed Jul. 17, 2002 now U.S. Pat. No. 7,006,798.

TECHNICAL FIELD

The present invention relates to a communication terminal apparatus, base station apparatus, and radio communication method to be used in a cellular communication system.

BACKGROUND ART

In a cellular communication system, one base station performs radio communication with a plurality of communication terminals simultaneously, and therefore, as demand has increased in recent years, so has the need for higher transmission efficiency.

One technology that has been proposed for increasing the transmission efficiency of a downlink from a base station to a communication terminal is HDR (High Data Rate). HDR is a communication method whereby a base station performs scheduling for allocating communication resources to communication terminals by time division, and also sets a transmission rate for each communication terminal according to the downlink channel quality.

The operations by which a base station and communication terminals perform radio communication with HDR are described below. First, the base station transmits a pilot signal to each communication terminal. Each communication terminal measures the downlink channel quality using a CIR (desired signal to interference ratio) based on the pilot signal, etc., and finds a transmission rate at which communication is possible. Then, based on the transmission rate at which communication is possible, each communication terminal selects a communication mode, which is a combination of packet length, coding method, and modulation method, and transmits a data rate control (hereinafter referred to as "DRC") signal indicating the communication mode to the base station.

The type of modulation method that can be used in each system is predetermined as BPSK, QPSK, 16QAM, 64QAM, and so forth. Also, the type of coding that can be used in each system is predetermined as ½ turbo code, ⅓ turbo code, ¾ turbo code, and so forth. Further, a plurality of transmission rates that can be used in each system are predetermined according to a combination of packet length, modulation method, and coding method. Each communication terminal selects a combination whereby communication can be performed most efficiently with the current downlink channel quality, and transmits a DRC signal indicating the selected communication mode to the base station. Generally, DRC signals are represented by numbers from 1 to N, with a higher number indicating a proportionally better downlink channel quality.

Based on the DRC signal transmitted from each communication terminal, the base station sets a transmission rate for each communication terminal, and sends a signal to each communication terminal via a control channel indicating communication resource allocation to each communication terminal. The base station then transmits data only to the relevant communication terminal in its allocated time. For example, if time t1 has been allocated to communication terminal A, in time t1 the base station transmits data only to communication terminal A, and does not transmit data to a communication terminal other than communication terminal A.

In this way, data transmission efficiency has conventionally been increased for the overall system by setting a transmission rate for each communication terminal according to channel quality by means of HDR, and performing communication resource allocation preferentially to a communication terminal with a high transmission rate at which communication is possible.

However, as downlink channel quality measurement in a communication terminal is performed based on the pilot-part signal within a received signal, if the length of the pilot-part signal is short compared with the length of the data-part signal, a difference may arise between the measured channel quality and the current channel quality due to the effect of fading, etc., while the data-part signal is being received. As communication mode selection is performed based on the measured channel quality, when such a difference arises there is a problem in that the communication mode in which communication can be performed most efficiently with the current channel quality will not be selected, and downlink throughput will fall.

Also, if error occurs in the channel quality measurement circuit, a difference will arise between the measured channel quality and the actual channel quality, and the same kind of problem as described above will arise.

DISCLOSURE OF INVENTION

It is an object of the present invention to provide a communication terminal apparatus, base station apparatus, and radio communication method that make it possible to prevent a fall in downlink throughput in a communication system in which communication resources are allocated by time division to communication terminals based on downlink channel quality measured from a pilot signal.

The present inventors arrived at the present invention by considering the relationship between a communication mode and the reception quality of a data-part signal, and finding that, when a difference arises between the measured channel quality and the current actual channel quality, and communication is not performed using the optimal communication mode for the current actual channel quality, the reception quality of the data-part signal either does not attain the desired reception quality, or else exceeds the desired reception quality.

Thus, in the present invention, the correspondence between downlink channel quality and communication mode is changed when a difference is detected between the measured channel quality and the current actual channel quality based on the reception quality of the data-part signal. By this means it is possible to perform communication using the optimal communication mode for the current actual channel quality.

BRIEF DESCRIPTION OF DRAWINGS

FIG. 2 is a drawing showing the contents of the communication mode table provided in a communication terminal according to Embodiment 1 of the present invention;

BEST MODE FOR CARRYING OUT THE INVENTION

With reference now to the accompanying drawings, embodiments of the present invention will be explained in detail below.

(Embodiment 1)

In a system in which data communication is performed, error control is normally performed by means of the ARQ (Automatic Repeat reQuest) method. With the ARQ method, data with check bits for error detection, such as CRC (Cyclic Redundancy Check) bits, added is transmitted from a base station to a communication terminal, and if an error is not detected in the received data, the communication terminal requests the next data by sending an ACK (ACKnowledgment) signal back to the base station. If, on the other hand, an error is detected in the received data, the communication terminal sends a NACK (Negative ACKnowledgment) signal back to the base station, and the base station retransmits the data in which an error was detected. This kind of retransmission is repeated by the base station until an ACK signal is received for the data in which an error was detected.

A communication terminal according to Embodiment 1 of the present invention is a communication terminal used in a communication system in which error control is performed by means of this kind of ARQ method, and determines the reception quality of a data-part signal according to the number of returns of a NACK signal, and based on the number of returns of a NACK signal, rewrites the contents of a communication mode table that indicates the correspondence between the downlink channel quality and communication mode.

Figure 1:
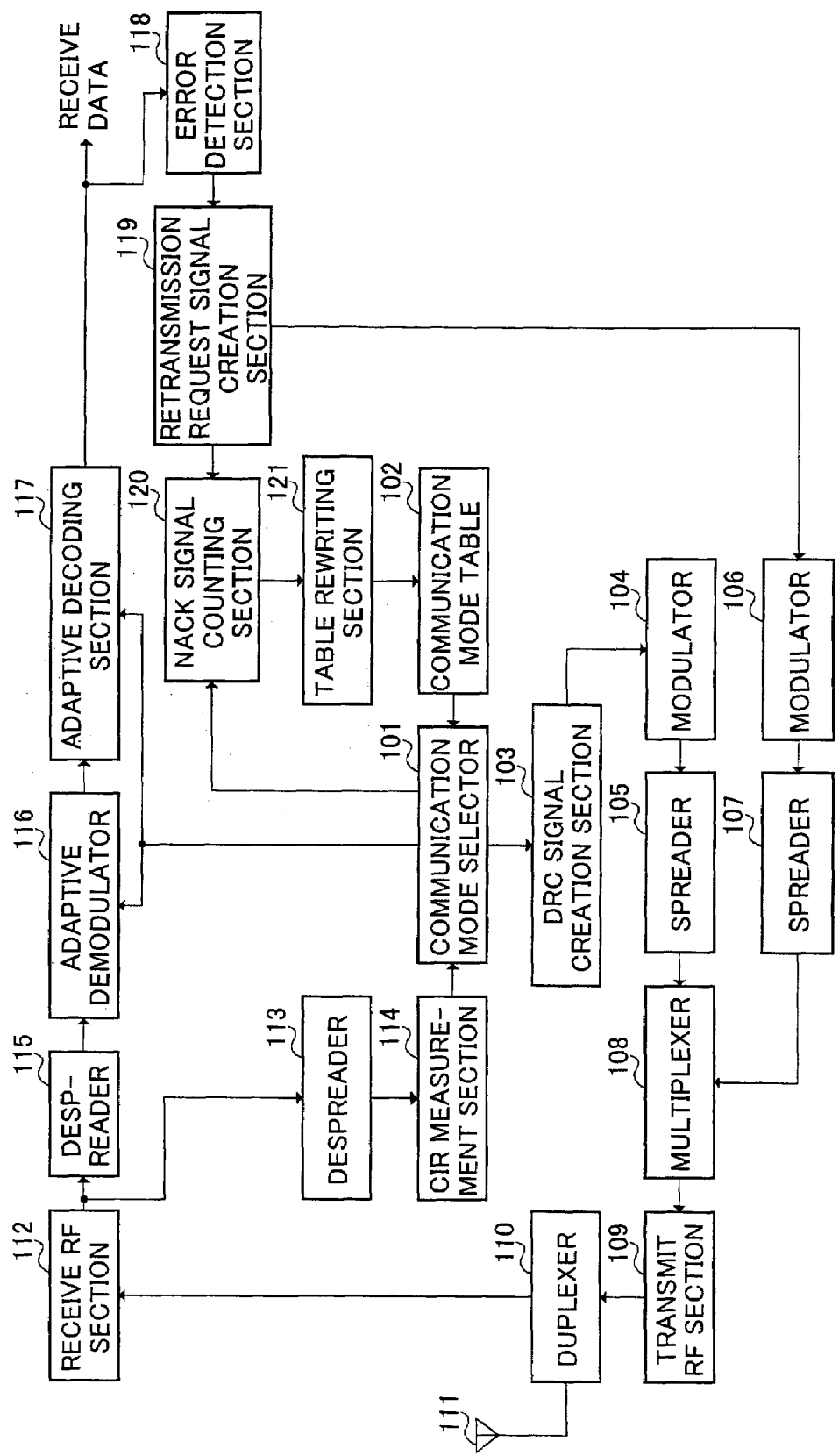
FIG. 1 is a block diagram-showing the configuration of a communication terminal according to Embodiment 1 of the present invention.

FIG. 1 is a block diagram showing the configuration of a communication terminal according to Embodiment 1 of the present invention. In FIG. 1, a communication mode selector 101 refers to a communication mode table 102 and selects a communication mode based on a CIR measured by a CIR measurement section 114 described later herein, and outputs this to a DRC signal creation section 103 and NACK signal counting section 120. Also, based on the selected communication mode, the communication mode selector 101 indicates the outbound receive data demodulation method to an adaptive demodulator 116 and indicates the outbound receive data decoding method to an adaptive decoding section 117. The contents of the communication mode table 102 will be described later herein.

The DRC signal creation section 103 creates a DRC signal with a number corresponding to the communication mode output from the communication mode selector 101, and outputs this signal to a modulator 104.

Modulator 104 modulates the DRC signal and outputs it to a spreader 105. Spreader 105 spreads the output signal from modulator 104, and outputs the resulting signal to a multiplexer 108.

A modulator 106 modulates an ACK signal or NACK signal created by a retransmission request signal creation section 119 described later herein, and outputs this signal to a spreader 107. Spreader 107 spreads the output signal from modulator 106, and outputs the resulting signal to the multiplexer 108.

The multiplexer 108 multiplexes the spread DRC signal and the spread ACK signal or NACK signal, and outputs them to a transmit RF section 109. The transmit RF section 109 converts the frequency of the output signal from the multiplexer 108 to radio frequency, and outputs the resulting signal to a duplexer 110.

The duplexer 110 transmits the output signal from the transmit RF section 109 to the base station as a radio signal via an antenna 111. In addition, the duplexer 110 outputs a signal transmitted as a radio signal from the base station and received as a radio signal by the antenna 111 to a receive RF section 112.

The receive RF section 112 converts the frequency of a radio frequency signal output from the duplexer 110 to baseband, and outputs the resulting signal to a despreader 113 and a despreader 115.

Despreader 113 despreads the pilot signal component of the baseband signal and outputs the resulting signal to a CIR measurement section 114. The CIR measurement section 114 measures the CIR of the pilot signal output from despreader 113, and outputs this to the communication mode selector 101.

Despreader 115 despreads the data component of the baseband signal and outputs the resulting signal to the adaptive demodulator 116. The adaptive demodulator 116 demodulates the output signal from despreader 115 in accordance with the directions of the communication mode selector 101, and outputs the resulting signal to the adaptive decoding section 117. The adaptive decoding section 117 decodes the output signal from the adaptive demodulator 116 in accordance with the directions of the communication mode selector 101, and obtains receive data.

An error detection section 118 performs a CRC on the receive data, and outputs a signal indicating the CRC result to the retransmission request signal creation section 119. That is to say, if the CRC result is that an error has not been detected in the receive data, the error detection section 118 outputs an OK signal indicating that an error has not been detected to the retransmission request signal creation section 119, and if the CRC result is that an error has been detected in the receive data, the error detection section 118 outputs an NG signal indicating that an error has been detected to the retransmission request signal creation section 119. The retransmission request signal creation section 119 creates an ACK signal if an OK signal is output from the error detection section 118, or generates a NACK signal if an NG signal is output from the error detection section 118, and outputs the respective signal to the NACK signal counting section 120 and modulator 106.

The NACK signal counting section 120 counts, for each communication mode, the number of NACK signals output before an ACK signal is output from the retransmission request signal creation section 119. In other words, the NACK signal counting section 120 counts the number of data retransmissions for each communication mode. A table rewriting section 121 compares the number of retransmissions counted by the NACK signal counting section 120 with a predetermined threshold value for the number of retransmissions, and rewrites the contents of the communication mode table 102 based on the result of this comparison.

Next, the operation of a communication terminal that has the above configuration will be described.

A radio signal transmitted from the base station is received by the antenna 111 of the communication terminal, passes through the duplexer 110, and is frequency-converted to baseband by the receive RF section 112. The baseband signal is despread by despreader 113 and output to the CIR measurement section 114.

In the CIR measurement section 114, the CIR of the pilot signal output from despreader 113 is measured. Then, in the communication mode selector 101, the communication mode table 102 is referred to and a communication mode is selected based on the CIR measured by the CIR measurement section 114.

Here, the contents set in the communication mode table 102 will be described. FIG. 2 is a drawing showing the contents of the communication mode table provided in a communication terminal according to Embodiment 1 of the present invention. For the sake of explanation, it is here assumed that communication modes are indicated only by the modulation method, and that the coding method is the same for all communication modes.

As shown in FIG. 2, communication modes are set in the communication mode table 102 in correspondence to CIRs, so that a communication mode is selected based on the pilot signal CIR measured by the CIR measurement section 114. For example, in the case where the CIR measured by the CIR measurement section 114 is A [dB].CIR<B [dB], a communication mode for which the modulation method is QPSK is selected by the communication mode selector 101, and a DRC signal with a number corresponding to the communication mode is created by the DRC signal creation section 103.

The DRC signal is modulated by modulator 104, spread by spreader 105 and output to the multiplexer 108. In this stage, only the DRC signal is output from the multiplexer 108.

The DRC signal output from the multiplexer 108 is frequency-converted to radio frequency by the transmit RF section 109, and is transmitted to the base station as a radio signal from the antenna 111 via the duplexer 110.

Next, a radio signal transmitted from the base station in accordance with the communication mode requested by the communication terminal is received by the antenna 111 of the communication terminal, passes through the duplexer 110, and is frequency-converted to baseband by the receive RF section 112. The baseband signal is despread by despreader 115, and the data-part signal is output to the adaptive demodulator 116.

In addition, the baseband signal is despread by despreader 113, and the pilot signal is output to the CIR measurement section 114. In the CIR measurement section 114 the CIR of the pilot signal is measured, and is output to the communication mode selector 101. In the communication mode selector 101 the communication mode is selected as described above.

The data-part signal is demodulated by the adaptive demodulator 116 using the demodulation method indicated by the communication mode selector 101, decoded by the adaptive decoding section 117 using the decoding method indicated by the communication mode selector 101, and output to the error detection section 118.

As CRC bits have been added to the data-part signal, a CRC is carried out on the data-part signal by the error detection section 118. By this means it is detected whether or not there is an error in the data-part signal, and a signal indicating the result of the detection (that is, an OK signal or an NG signal) is output to the retransmission request signal creation section 119.

In the retransmission request signal creation section 119, an ACK signal is created if the signal output from the error detection section 118 is an OK signal, or a NACK signal is created if the signal output from the error detection section 118 is an NG signal, and the created signal is output to the NACK signal counting section 120 and modulator 106.

The ACK signal or NACK signal is modulated by modulator 106, spread by spreader 107, multiplexed with the DRC signal by the multiplexer 108, and output to the transmit RF section 109. The output signal from the multiplexer 108 is frequency-converted to radio frequency by the transmit RF section 109, and is transmitted to the base station as a radio signal from the antenna 111 via the duplexer 110.

In the NACK signal counting section 120, the number of times a NACK signal is output from the retransmission request signal creation section 119 is counted for the currently selected communication mode.

Then, in the base station, if an ACK signal is received the next data is transmitted to the communication terminal, or if a NACK signal is received the same data as previously transmitted is retransmitted to the communication terminal.

As a result of repeating the above-described operations, the NACK signal counting section 120 counts, for the currently selected communication mode, the number of NACK signals output before an ACK signal is output from the retransmission request signal creation section 119. That is to say, in the NACK signal counting section 120 the number of retransmissions of data transmitted from the base station is successively counted for the currently selected communication mode. When an ARQ signal is output from the retransmission request signal creation section 119, the NACK signal counting section 120 count result is reset to 0.

Figure 3:
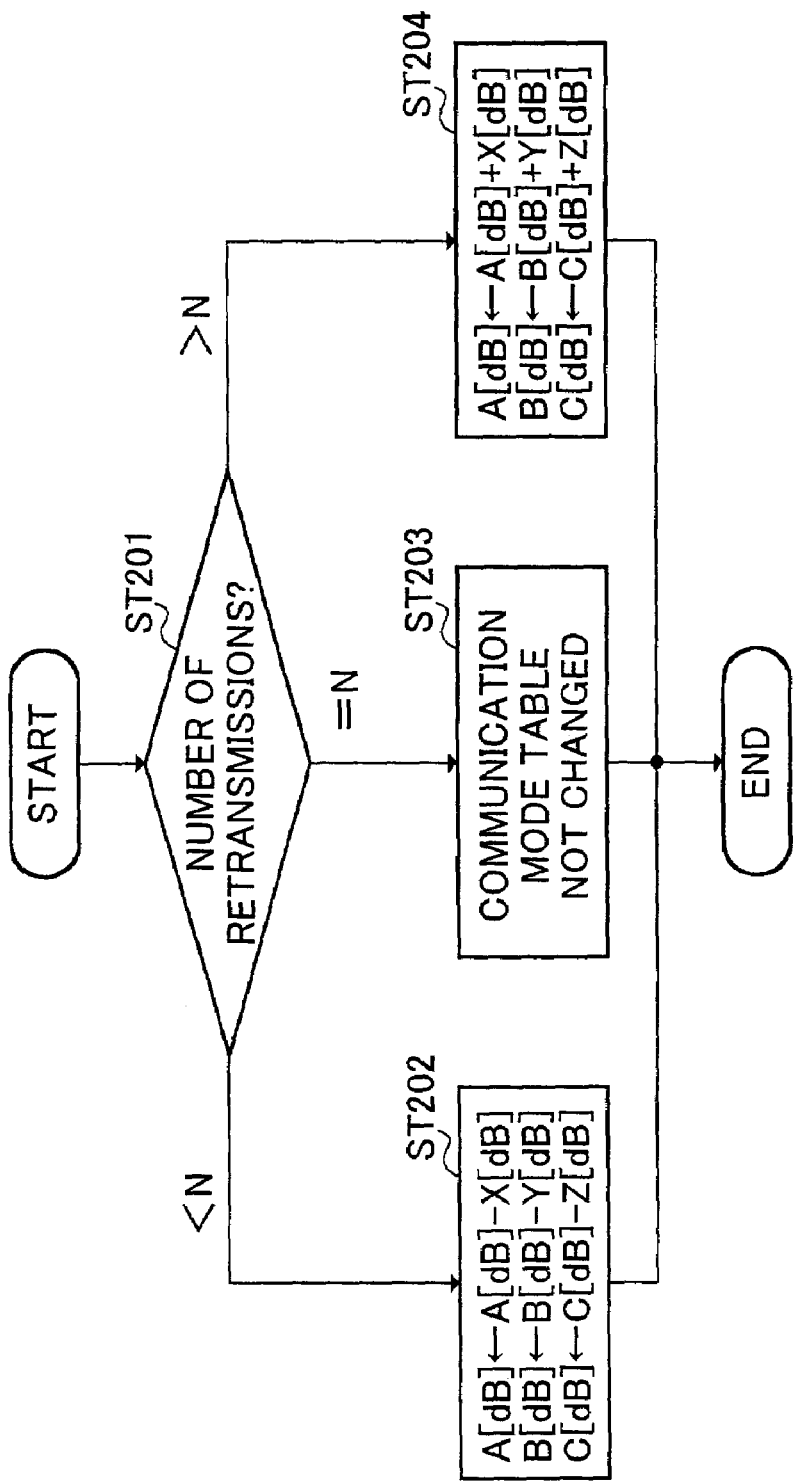
FIG. 3 is an operational flowchart for explaining the operation of the table rewriting section provided in a communication terminal according to Embodiment 1 of the present invention.

Then, in the table rewriting section 121, the number of retransmissions counted by the NACK signal counting section 120 is compared with a predetermined threshold value N, and the contents of the communication mode table 102 are rewritten based on the result of this comparison. Here, the operation of the table rewriting section 121 will be described. FIG. 3 is an operational flowchart for explaining the operation of the table rewriting section provided in a communication terminal according to Embodiment 1 of the present invention.

In the table rewriting section 121, the number of retransmissions counted by the NACK signal counting section 120 is compared with a predetermined threshold value N in Step (hereinafter abbreviated to "ST") 201. Here, the threshold value N is the maximum number of retransmissions permitted in the system, and this permissible value N is predetermined based on the desired reception quality of data-part signals required in the system.

If, in ST201, the number of retransmissions is less than N, the data-part signal reception quality can be said to be excessive quality that exceeds the desired reception quality required in the system. That is to say, the current actual downlink channel quality can be considered to have improved since the point at which channel quality was measured by the CIR measurement section 114. It can therefore be determined that, with the current actual downlink channel quality, communication can be performed using a communication mode with a higher transmission rate than the communication mode selected based on the pilot signal CIR.

Thus, if the number of retransmissions is less than N in ST201, the contents of the communication mode table 102 shown in. FIG. 2 are rewritten as shown in ST202 by the table rewriting section 121. That is to say, A [dB], B [dB], and C [dB] set in the communication mode table 102 shown in FIG. 2 are decremented respectively by predetermined values X [dB], Y [dB], and Z [dB]. As a result, the communication mode selector 101 selects a communication mode with a higher transmission rate than the previously selected communication mode, even if the pilot signal CIR measured by the CIR measurement section 114 is the same.

If, on the other hand, the number of retransmissions is greater than N in ST201, the data-part signal reception quality can be said not to attain the desired reception quality required in the system. That is to say, the current actual downlink channel quality can be considered to have degraded since the point at which channel quality was measured by the CIR measurement section 114. It can therefore be determined that, with the current actual downlink channel quality, it is necessary for communication to be performed using a communication mode with a lower transmission rate than the communication mode selected based on the pilot signal CIR.

Thus, if the number of retransmissions is greater than N in ST201, the contents of the communication mode table 102 shown in FIG. 2 are rewritten as shown in ST204 by the table rewriting section 121. That is to say, A [dB], B [dB], and C [dB] set in the communication mode table 102 shown in FIG. 2 are incremented respectively by predetermined values X [dB], Y [dB], and Z [dB]. As a result, the communication mode selector 101 selects a communication mode with a lower transmission rate than the previously selected communication mode, even if the pilot signal CIR measured by the CIR measurement section 114 is the same.

If the number of retransmissions is equal to N in ST201, the data-part signal reception quality can be said to be on a level with the desired reception quality required in the system, and therefore the contents of the communication mode table are not rewritten, as shown in ST203.

Figures 4A, 4B, 4C:
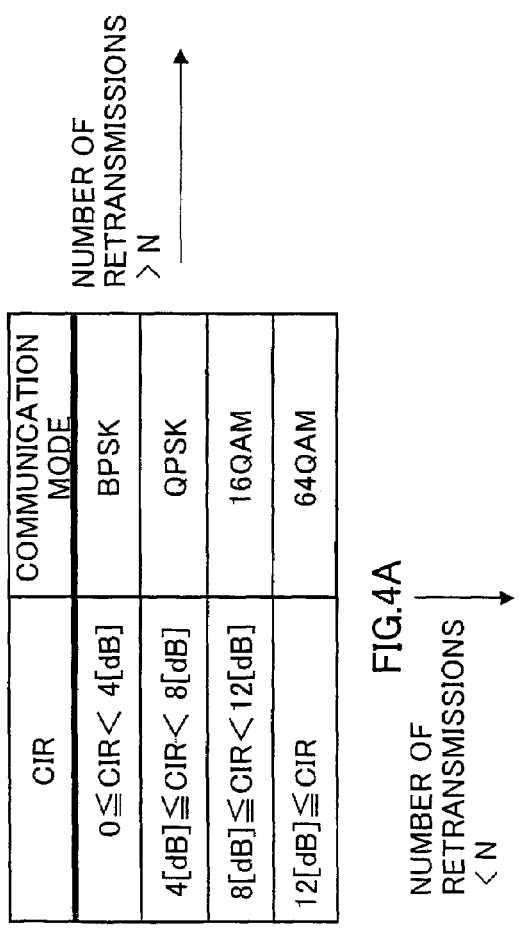
FIG. 4A is drawing showing an example of a communication mode table rewrite operation by the table rewriting section of a communication terminal according to Embodiment 1 of the present invention.
FIG. 4B is drawing showing an example of a communication mode table rewrite operation by the table rewriting section of a communication terminal according to Embodiment 1 of the present invention.
FIG. 4C is drawing showing an example of a communication mode table rewrite operation by the table rewriting section of a communication terminal according to Embodiment 1 of the present invention.

Actual examples of the communication mode table rewrite operations described above are illustrated in FIG. 4A through FIG. 4C. FIG. 4A through FIG. 4C are drawings showing examples of communication mode table rewrite operations by the table rewriting section of a communication terminal according to Embodiment 1 of the present invention. Explanations are given here for the case where A [dB], B [dB], and C [dB] currently set in the communication mode table 102 shown in FIG. 2 are 4 [dB], 8 [dB], and 12 [dB], respectively, and variation amounts X [dB], Y [dB], and Z [dB] are all 1 [dB].

First, in FIG. 4A, A [dB], B [dB], and C [dB] are set to 4 [dB], 8 [dB], and 12 [dB], respectively. Then, if the number of retransmissions is less than N, A [dB], B [dB], and C [dB] are all decremented by 1 [dB] each, and the communication mode table 102 is rewritten as shown in FIG. 4B. If, on the other hand, the number of retransmissions is greater than N, A [dB], B [dB], and C [dB] are all incremented by 1 [dB] each, and the communication mode table 102 is rewritten as shown in FIG. 4C.

In this way, based on the number of retransmissions of a data-part signal (that is, the data-part signal reception quality), the table rewriting section 121 detects that a difference has arisen between the channel quality measured by the CIR measurement section 114 and the current actual channel quality, and rewrites the contents of the communication mode table 102.

Thus, according to this embodiment, the reception quality of a data-part signal is determined by the number of times a NACK signal is sent back, and the contents of a communication mode table indicating the correspondence between downlink channel quality and communication modes are rewritten based on the number of times a NACK signal is sent back, thereby making it possible to select a communication mode that enables communication to be performed most efficiently with the current actual channel quality.

Also, according to this embodiment, data-part signal reception quality is determined according to the number of retransmissions based on a CRC, so that reception quality determination can be performed quickly and easily, enabling communication mode table rewrites to be performed at high-speed, keeping up with variations in channel quality.

Moreover, according to this embodiment, communication mode table rewrites are performed with reference to a maximum number of retransmissions permitted in the system. In other words, communication mode table rewrites are performed with reference to a desired reception quality required in the system. Thus, according to this embodiment, it is possible to perform downlink data communication while maintaining the desired reception quality required in the system.

In this embodiment, it is also possible for the NACK signal counting section 120 to calculate an average value of the number of retransmissions at predetermined intervals for each communication mode, and for the table rewriting section 121 to rewrite the communication mode table 102 based on the result of a comparison between. that average value of the number of retransmissions and a predetermined threshold value N. The reliability of the number of retransmissions is improved by calculating an average value of the number of retransmissions in this way, enabling communication mode table rewrites to be performed accurately and without errors.

(Embodiment 2)

A communication terminal according to Embodiment 2 of the present invention determines the reception quality of a data-part signal by means of the error rate, and based on this error rate, rewrites the contents of a communication mode table indicating the correspondence between downlink channel quality and communication modes.

Figure 5:
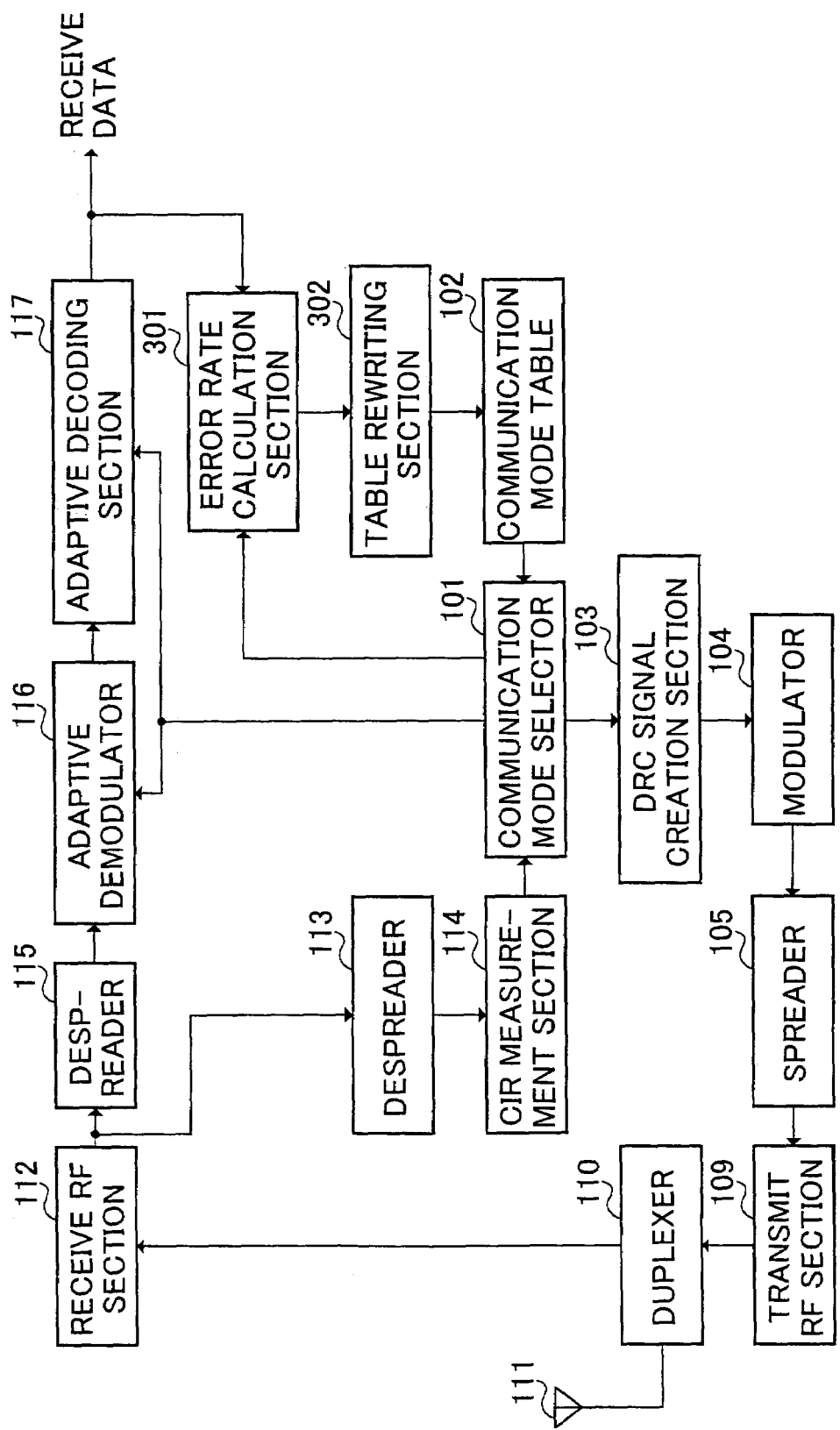
FIG. 5 is a block diagram showing the configuration of a communication terminal according to Embodiment 2 of the present invention.

FIG. 5 is a block diagram showing the configuration of a communication terminal according to Embodiment 2 of the present invention. As shown in this figure, a communication terminal according to this embodiment differs from the communication terminal shown in FIG. 1 in being provided with an error rate calculation section 301 and table rewriting section 302 instead of an error detection section 118, retransmission request signal creation section 119, NACK signal counting section 120, and table rewriting section 121. In the following description, parts identical to those in FIG. 1 are assigned the same codes as in FIG. 1 and their detailed explanations are omitted.

In FIG. 5, a communication mode selector 101 refers to a communication mode table 102 and selects a communication mode based on a CIR measured by a CIR measurement section 114, and outputs this to a DRC signal creation section 103 and the error rate calculation section 301.

The error rate calculation section 301 calculates the error rate of the data-part signal output from an adaptive decoding section 117 for each communication mode, and outputs this to the table rewriting section 302. Here, the Bit Error Rate (BER) or BLock Error Rate (BLER) is used as the error rate calculated by the error rate calculation section 301. The bit error rate can be calculated by comparing data-part signals before and after error correction to detect a bit in which an error has occurred, and the block error rate can be calculated by performing a CRC to detect a block in which an error has occurred. The bit error rate has the advantage of more accurately indicating the reception quality of a data-part signal than the block error rate, while the block error rate has the advantage of being able to be calculated with a simpler equipment configuration than the bit error rate.

The table rewriting section 302 compares the error rate calculated by the error rate calculation section 301 with a predetermined error rate threshold value, and rewrites the contents of the communication mode table 102 based on the result of the comparison. Here, the predetermined threshold value is the error rate permitted in the system, this permissible value being determined beforehand based on the desired data-part signal reception quality required in the system.

If the error rate calculated by the error rate calculation section 301 is lower than the predetermined threshold value, the data-part signal reception quality can be said to be excessive quality that exceeds the desired reception quality required in the system. That is to say, the current actual downlink channel quality can be considered to have improved since the point at which channel quality was measured by the CIR measurement section 114. It can therefore be determined that, with the current actual downlink channel quality, communication can be performed using a communication mode with a higher transmission rate than the communication mode selected based on the pilot signal CIR.

Thus, if the error rate calculated by the error rate calculation section 301 is lower than the predetermined threshold value, A [dB], B [dB], and C [dB] set in the communication mode table 102 shown in FIG. 2 are decremented by the table rewriting section 302 by predetermined values X [dB], Y [dB], and Z [dB], respectively, in the same way as in above-described Embodiment 1.

If, on the other hand, the error rate calculated by the error rate calculation section 301 is higher than the predetermined threshold value, the data-part signal reception quality can be said not to attain the desired reception quality required in the system. That is to say, the current actual downlink channel quality can be considered to have degraded since the point at which channel quality was measured by the CIR measurement section 114. It can therefore be determined that, with the current actual downlink channel quality, it is necessary for communication to be performed using a communication mode with a lower transmission rate than the communication mode selected based on the pilot signal CIR.

Thus, if the error rate calculated by the error rate calculation section 301 is higher than the predetermined threshold value, A [dB], B [dB], and C [dB] set in the communication mode table 102 shown in FIG. 2 are incremented by the table rewriting section 302 by predetermined values X [dB], Y [dB], and Z [dB], respectively, in the same way as in above-described Embodiment 1.

In this way, based on the error rate of a data-part signal (that is, the data-part signal reception quality), the table rewriting section 302 detects that a difference has arisen between the channel quality measured by the CIR measurement section 114 and the current actual channel quality, and rewrites the contents of the communication mode table 102.

Thus, according to this embodiment, the reception quality of a data-part signal is determined by the error rate, and the contents of a communication mode table indicating the correspondence between downlink channel quality and communication modes are rewritten based on this error rate, thereby making it possible to select a communication mode that enables communication to be performed most efficiently with the current actual channel quality.

Also, according to this embodiment, determining data-part signal reception quality by means of the error rate enables data-part signal reception quality to be determined more accurately. Therefore, communication mode table rewrites can be performed accurately and without errors.

(Embodiment 3)

A communication terminal according to Embodiment 3 of the present invention determines the reception quality of a data-part signal by means of data-part signal throughput, and based on this throughput, rewrites the contents of a communication mode table indicating the correspondence between downlink channel quality and communication modes.

Figure 6:
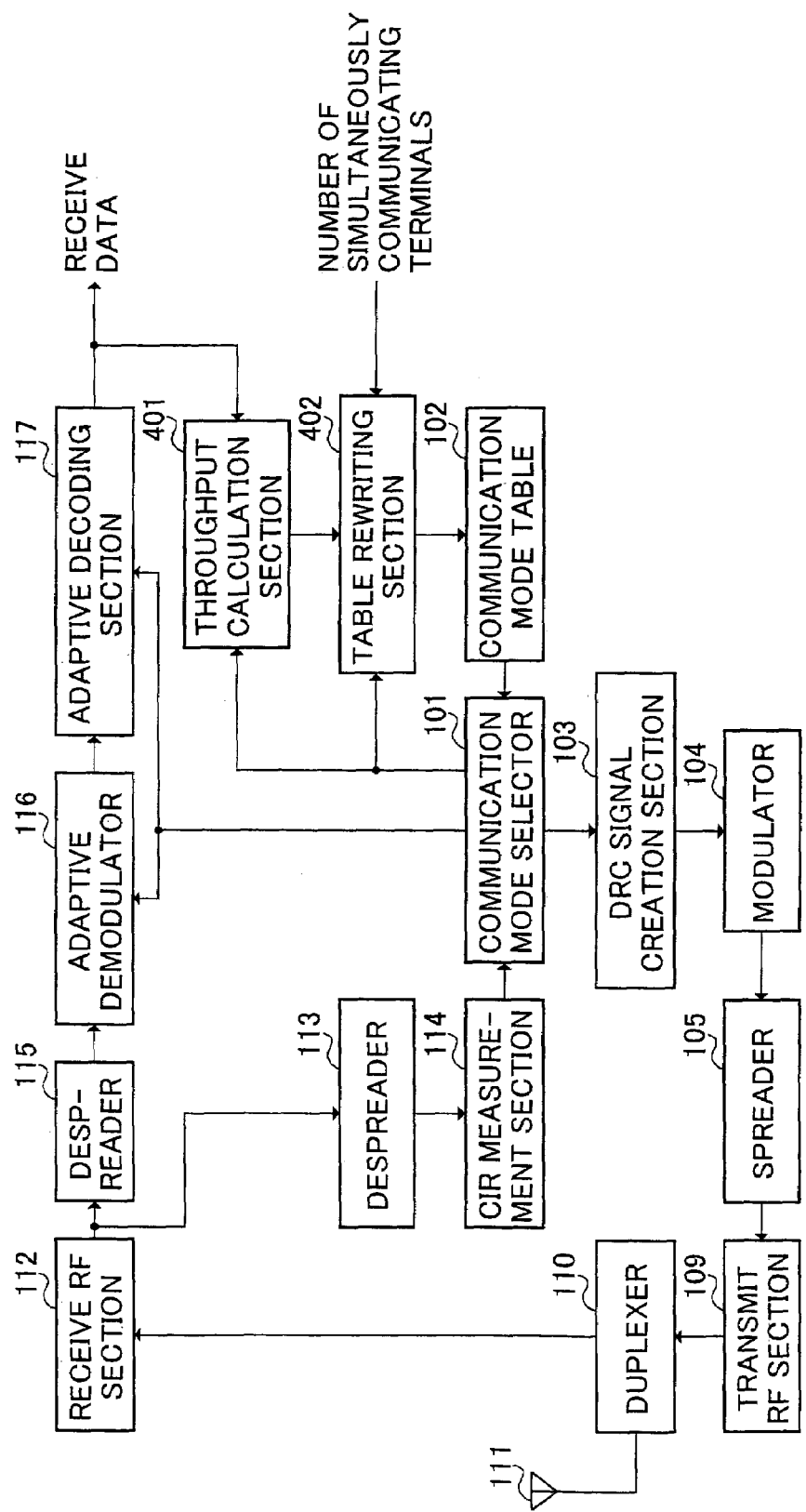
FIG. 6 is a block diagram showing the configuration of a communication terminal according to Embodiment 3 of the present invention.

FIG. 6 is a block diagram showing the configuration of a communication terminal according to Embodiment 3 of the present invention. As shown in this figure, a communication terminal according to this embodiment differs from the communication terminal shown in FIG. 1 in being provided with a throughput calculation section 401 and table rewriting section 402 instead of an error detection section 118, retransmission request signal creation section 119, NACK signal counting section 120, and table rewriting section 121. In the following description, parts identical to those in FIG. 1 are assigned the same codes as in FIG. 1 and their detailed explanations are omitted.

In FIG. 6, a communication mode selector 101 refers to a communication mode table 102 and selects a communication mode based on a CIR measured by a CIR measurement section 114, and outputs this to a DRC signal creation section 103, the throughput calculation section 401, and the table rewriting section 402.

The throughput calculation section 401 calculates the average throughput of the data-part signal output from an adaptive decoding section 117 at predetermined intervals for each communication mode, and outputs this to the table rewriting section 402. As [Mbps] is normally used as the unit of throughput, the throughput calculation section 401 can calculate the average data-part signal throughput by finding the average number of data-part signal bits received per second.

The table rewriting section 402 compares the average throughput calculated by the throughput calculation section 401 with a predetermined throughput threshold value, and rewrites the contents of the communication mode table 102 based on the result of the comparison. One method of calculating the predetermined throughput value is described below.

If the number of terminals currently simultaneously communicating with a base station (hereinafter referred to as "number of simultaneously communicating terminals") is N, of the signals transmitted from the base station, on average 1/N can be assumed to be signals transmitted to the terminal being considered. Therefore, if a communication mode is selected that is expected to enable a throughput of 2 [Mbps] to be attained, for example, an average throughput of 1.2/N [Mbps] can be expected to be attained by a communication terminal for which that mode is selected. This 1.2/N [Mbps] throughput is then the above-mentioned predetermined threshold value.

Thus, the table rewriting section 402 calculates a predetermined threshold value for each communication mode based on the communication mode output from the communication mode selector 101 and the number of simultaneously communicating terminals, and compares the average throughput calculated for each communication mode by the throughput calculation section 401 with the corresponding predetermined threshold value. It is assumed that terminals are notified of the number of simultaneously communicating terminals by the base station.

The predetermined throughput threshold value is not limited to that described above, but may, for example, be determined beforehand on the basis of desired data-part signal reception quality required in the system, as in above-described Embodiments 1 and 2.

If the average throughput calculated by the throughput calculation section 401 is higher than the predetermined threshold value, the current actual downlink channel quality can be considered to have improved since the point at which channel quality was measured by the CIR measurement section 114. It can therefore be determined that, with the current actual downlink channel quality, communication can be performed using a communication mode with a higher transmission rate than the communication mode selected based on the pilot signal CIR.

Thus, if the average throughput calculated by the throughput calculation section 401 is higher than the predetermined threshold value, A [dB], B [dB], and C [dB] set in the communication mode table 102 shown in FIG. 2 are decremented by the table rewriting section 402 by predetermined values X [dB], Y [dB], and Z [dB], respectively, in the same way as in above-described Embodiment 1.

If, on the other hand, the average throughput calculated by the throughput calculation section 401 is lower than the predetermined threshold value, the current actual downlink channel quality can be considered to have degraded since the point at which channel quality was measured by the CIR measurement section 114. It can therefore be determined that, with the current actual downlink channel quality, it is necessary for communication to be performed using a communication mode with a lower transmission rate than the communication mode selected based on the pilot signal CIR.

Thus, if the average throughput calculated by the throughput calculation section 401 is lower than the predetermined threshold value, A [dB], B [dB], and C [dB] set in the communication mode table 102 shown in FIG. 2 are incremented by the table rewriting section 402 by predetermined values X [dB], Y [dB], and Z [dB], respectively, in the same way as in above-described Embodiment 1.

In this way, based on the average throughput of a data-part signal (that is, the data-part signal reception quality), the table rewriting section 402 detects that a difference has arisen between the channel quality measured by the CIR measurement section 114 and the current actual channel quality, and rewrites the contents of the communication mode table 102.

Thus, according to this embodiment, the reception quality of a data-part signal is determined by the data-part signal throughput, and the contents of a communication mode table indicating the correspondence between downlink channel quality and communication modes are rewritten based on this throughput, thereby making it possible to select a communication mode that enables communication to be performed most efficiently with the current actual channel quality.

Also, throughput is a value that indicates actual reception quality in a communication terminal more accurately than the number of retransmissions or the error rate. Therefore, rewriting the communication mode table based on throughput enables communication mode table rewrites to be performed more accurately.

(Embodiment 4)

In above-described Embodiments 1 to 3, a communication terminal selects a communication mode based on the pilot signal CIR, and transmits a DRC signal corresponding to that selected communication mode to the base station. DRC signal information can be represented with far fewer bits than other information indicating downlink channel quality (such as a downlink CIR, for example), and therefore use of a DRC signal has the advantage of enabling the downlink channel utilization ratio to be increased. On the other hand, since a communication terminal has to select the communication mode and create a DRC signal, and must be provided with a table for communication mode selection, a table for DRC signal creation, and so forth, there are the disadvantages of increased communication terminal power consumption and equipment scale.

Thus, in the embodiment described below, a communication terminal transmits a CIR signal indicating the pilot signal CIR to the base station, and the base station refers to a communication mode table and selects a communication mode based on the CIR. As a result, although there is the disadvantage of a slight decrease in the uplink channel utilization ratio, the fact that communication terminals do not have to select the communication mode and create a DRC signal, and do not need to be provided with a communication mode selection table, DRC signal creation table, and so forth, offers the major advantage of enabling communication terminal power consumption and equipment scale to be reduced. Also, in the embodiment described below, it is possible for CIRs transmitted from a plurality of terminals to be compared in the base station, and the correct communication mode to be determined with certainty, making the embodiment described below particularly useful in cases such as those where it is not possible for the communication mode to be determined simply from the CIR in each communication terminal.

This embodiment will be described below. A base station according to Embodiment 4 rewrites the contents of a communication mode table indicating the correspondence between downlink channel quality and communication modes based on the number of times a NACK signal is sent back from a communication terminal.

Figure 7:
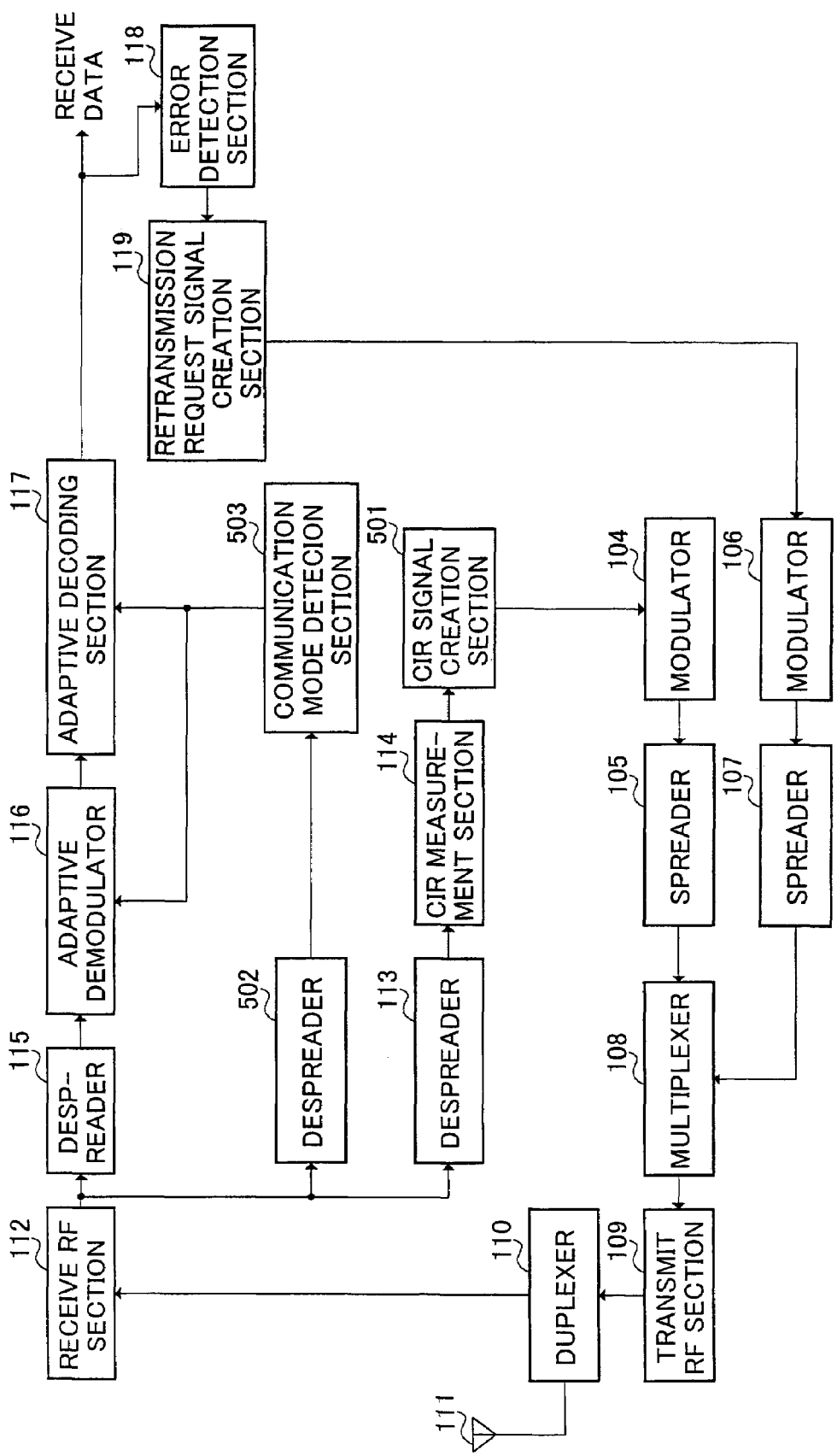
FIG. 7 is a block diagram showing the configuration of a communication terminal that performs radio communication with a base station according to Embodiment 4 of the present invention.

FIG. 7 is a block diagram showing the configuration of a communication terminal that performs radio communication with a base station according to Embodiment 4 of the present invention. In the following description, parts identical to those in FIG. 1 are assigned the same codes as in FIG. 1 and their detailed explanations are omitted.

In FIG. 7, a CIR signal creation section 501 creates a CIR signal that indicates the pilot signal CIR measured by a CIR measurement section 114, and outputs this signal to a modulator 104. Modulator 104 modulates the CIR signal and outputs it to a spreader 105.

A despreader 502 despreads a baseband signal with the spreading code used to despread a signal indicating the communication mode, and outputs the despread signal to a communication mode detection section 503. The communication mode detection section 503 demodulates the output signal from the despreader 502 and detects the communication mode. Then, based on the detected communication mode, the communication mode detection section 503 indicates the outbound receive data demodulation method to an adaptive demodulator 116 and indicates the outbound receive data decoding method to an adaptive decoding section 117.

Figure 8:
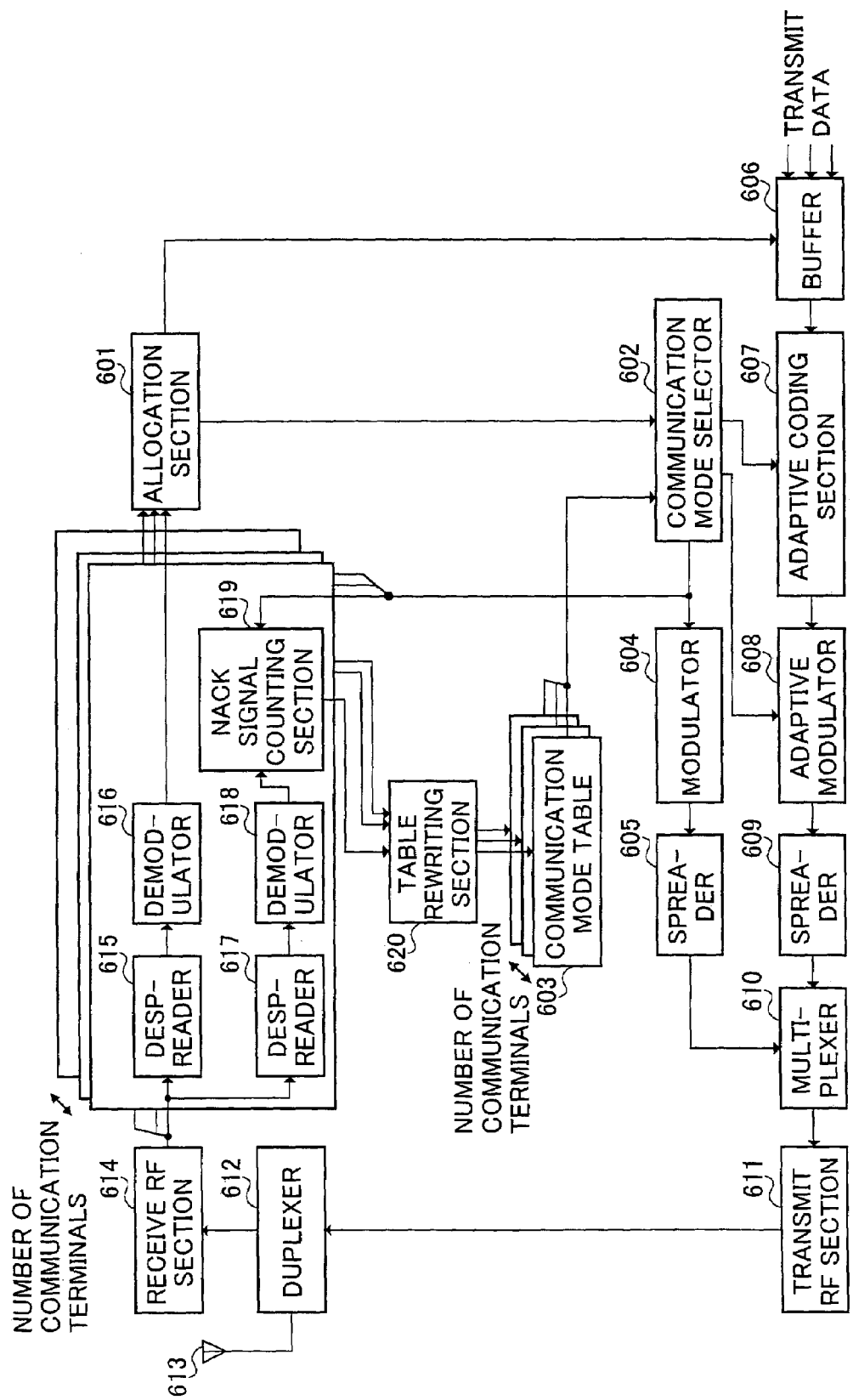
FIG. 8 is a block diagram showing the configuration of a base station according to Embodiment 4 of the present invention.

FIG. 8 is a block diagram showing the configuration of a base station according to Embodiment 4 of the present invention.

In FIG. 8, an allocation section 601 determines communication resource allocation to each communication terminal based on a CIR indicated by a CIR signal extracted by a demodulator 616 described later herein. Then, based on the determined communication resource allocation, the allocation section 601 gives an instruction to a buffer 606 for output of outbound transmit data, and outputs the CIR signal to a communication mode selector 602.

The communication mode selector 602 refers to a communication mode table 603, selects a communication mode based on the CIR indicated by the CIR signal output from the allocation section 601, and outputs a signal indicating that communication mode to a modulator 604 and NACK signal counting section 619. Also, based on the selected communication mode, the communication mode selector 602 indicates the outbound transmit data coding method to an adaptive coding section 607 and indicates the outbound transmit data modulation method to an adaptive modulator 608. The contents set in the communication mode table 603 are identical to those shown in FIG. 2, and therefore a description thereof will be omitted here. A communication mode table 603 is provided for each communication terminal.

The modulator 604 modulates the signal indicating the communication mode, and outputs it to a spreader 605. Spreader 605 spreads the output signal from the modulator 604 and outputs the resulting signal to a multiplexer 610. The buffer 606 holds outbound transmit data, and outputs outbound transmit data for a predetermined communication terminal to the adaptive coding section 607 in accordance with directions from the allocation section 601. The adaptive coding section 607 codes the output signal from the buffer 606 in accordance with directions from the communication mode selector 602, and outputs the resulting signal to the adaptive modulator 608. The adaptive modulator 608 modulates the output signal from the adaptive coding section 607 in accordance with directions from the communication mode selector 602, and outputs the resulting signal to a spreader 609. Spreader 609 spreads the output signal from the adaptive modulator 608, and outputs the resulting signal to the multiplexer 610. The multiplexer 610 multiplexes the signal indicating the communication mode with outbound transmit data, and outputs the resulting signal to a receive RF section 611. The receive RF section 611 converts the frequency of the output signal from the multiplexer 610 to radio frequency and outputs it to a duplexer 612.

The duplexer 612 transmits the output signal from the transmit RF section 611 to the communication terminals as a radio signal via an antenna 613. In addition, the duplexer 612 outputs a signal transmitted as a radio signal from a communication terminal and received as a radio signal by the antenna 613 to a receive RF section 614. The receive RF section 614 converts the frequency of a radio frequency signal output from the duplexer 612 to baseband, and outputs the resulting signal to a despreader 615 and a despreader 617. Despreader 615 despreads the baseband signal with the spreading code used to spread the CIR signal, and outputs the resulting signal to a demodulator 616. Demodulator 616 demodulates the output signal from despreader 615 and extracts the CIR signal, which it outputs to the allocation section 601.

Despreader 617 despreads the baseband signal with the spreading code used to spread an ACK signal or NACK signal, and outputs the resulting signal to a demodulator 618. Demodulator 618 demodulates the output signal from despreader 617 and extracts an ACK signal or NACK signal, which it outputs to the NACK signal counting section 619. The NACK signal counting section 619 counts, for each communication mode, the number of NACK signals output before an ACK signal is output from demodulator 618. In other words, the NACK signal counting section 619 counts the number of data retransmissions for each communication mode.

A despreader 615, demodulator 616, despreader 617, demodulator 618, and NACK signal counting section 619 are provided for each communication terminal. A CIR signal for each communication terminal is output from the corresponding demodulator 616, and the number of data retransmissions is counted by the respective NACK signal counting sections 619 for each communication terminal and for each communication mode.

A table rewriting section 620 compares the number of retransmissions counted by the NACK signal counting section 619 with a predetermined threshold value for the number of retransmissions, and rewrites the contents of the communication mode table 603 for the relevant communication terminal based on the result of this comparison.

Next, the operation of a base station with the above configuration will be described.

An ACK signal or NACK signal transmitted from a communication terminal is demodulated by demodulator 618 and output to the NACK signal counting section 619. In the NACK signal counting section 619, the number of NACK signals output before an ACK signal is output from demodulator 618 is counted for the currently selected communication mode. That is to say, in the NACK signal counting section 619 the number of retransmissions of data to the communication terminal is successively counted for the currently selected communication mode. When an ARQ signal is output from demodulator 618, the NACK signal counting section 619 count result is reset to 0.

Then, in the table rewriting section 620, the number of retransmissions counted by the NACK signal counting section 619 is compared with a predetermined threshold value N, and the contents of the communication mode table 603 for the relevant communication terminal are rewritten based on the result of this comparison. The table rewriting section 603 rewrite operation is as described in Embodiment 1 above, and so a description of this operation will be omitted here.

Thus, according to this embodiment, in the same way as in above-described Embodiment 1, the contents of a communication mode table indicating the correspondence between downlink channel quality and communication modes are rewritten based on the number of times a NACK signal is sent back from a communication terminal, thereby enabling the same kind of effect to be obtained as with above-described Embodiment 1.

(Embodiment 5)

A communication terminal according to Embodiment 5 of the present invention rewrites the contents of a communication mode table indicating the correspondence between downlink channel quality and communication modes based on the data-part signal error rate notified by a communication terminal.

Figure 9:
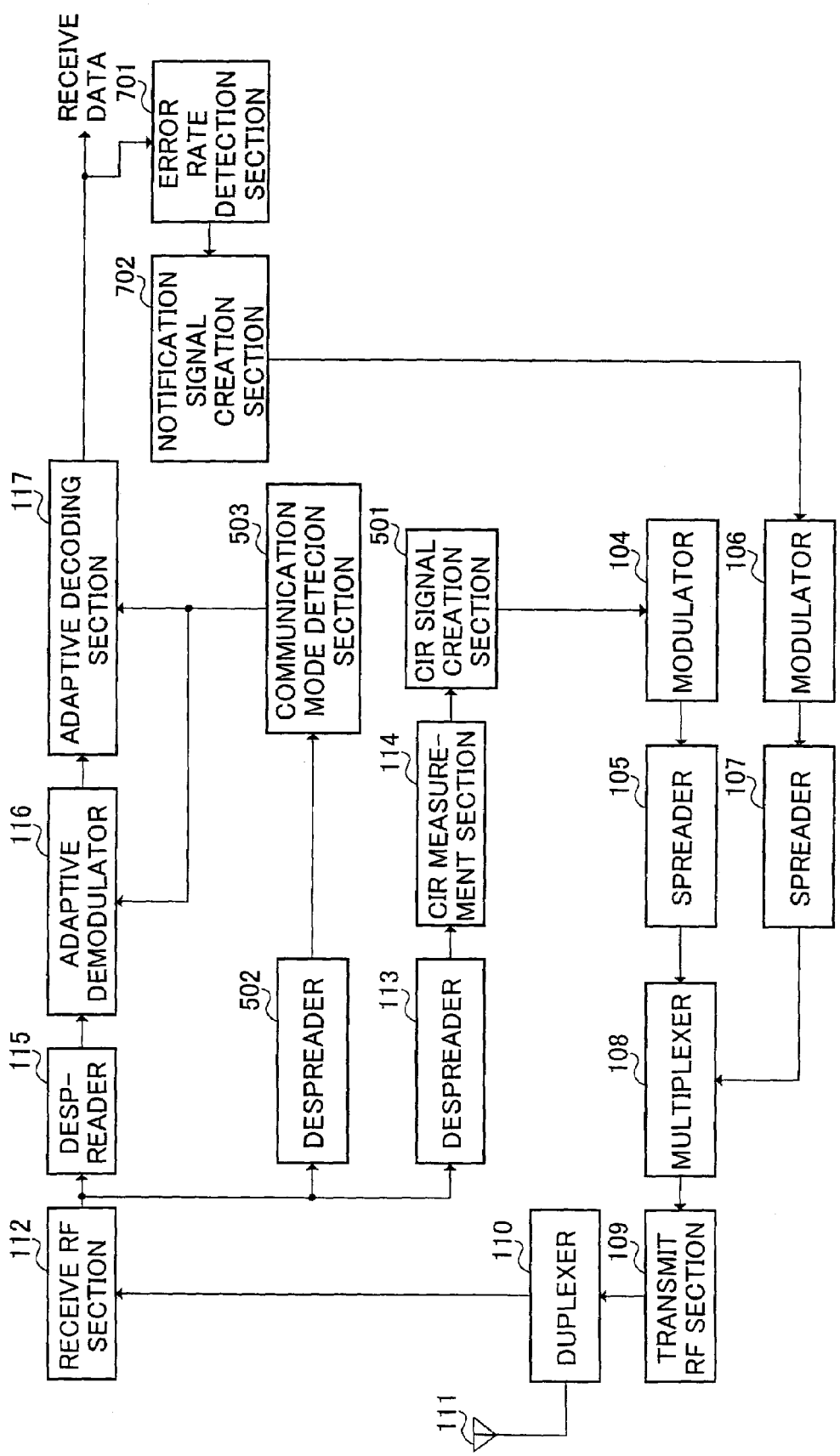
FIG. 9 is a block diagram showing the configuration of a communication terminal that performs radio communication with a base station according to Embodiment 5 of the present invention.

A base station according to this embodiment will be described below. FIG. 9 is a block diagram showing the configuration of a communication terminal that performs radio communication with a base station according to Embodiment 5 of the present invention. In the following description, parts identical to those in FIG. 7 are assigned the same codes as in FIG. 7 and their detailed explanations are omitted.

In FIG. 9, an error rate detection section 701 detects the error rate of a data-part signal output from an adaptive decoding section 117, and outputs this to a notification signal creation section 702. The detailed operation of the error rate detection section 701 is as described in Embodiment 2 above, and so a description of this operation will be omitted here.

The notification signal creation section 702 creates a signal indicating the error rate and outputs this signal to a modulator 106. The signal indicating the error rate is modulated by modulator 106, spread by a spreader 107, multiplexed with a CIR signal by a multiplexer 108, and transmitted to the base station.

Figure 10:
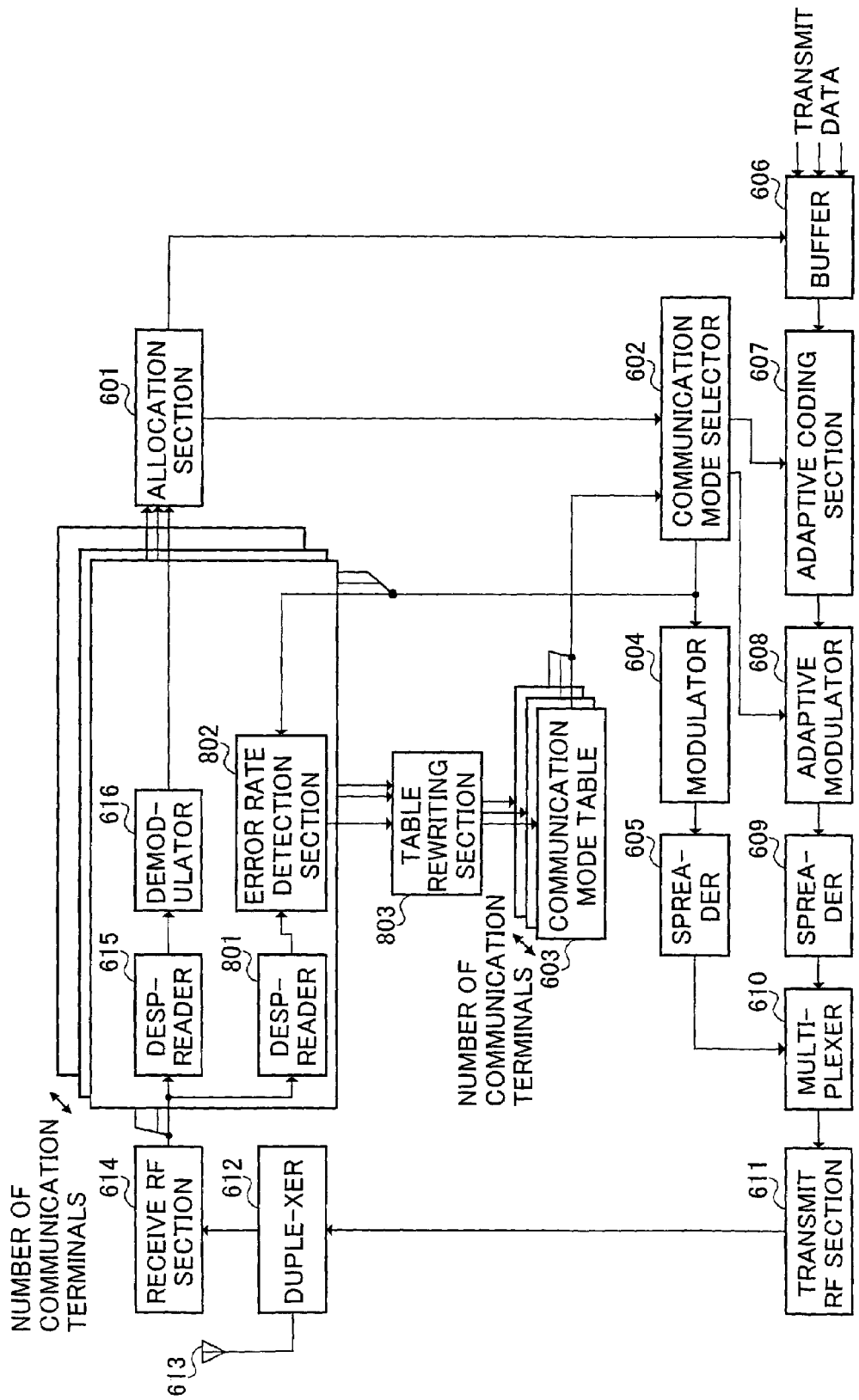
FIG. 10 is a block diagram showing the configuration of a base station according to Embodiment 5 of the present invention.

FIG. 10 is a block diagram showing the configuration of a base station according to Embodiment 5 of the present invention. In the following description, parts identical to those in FIG. 8 are assigned the same codes as in FIG. 8 and their detailed explanations are omitted.

In FIG. 10, a communication mode selector 602 outputs a signal indicating the selected communication mode to a modulator 604 and error rate detection section 802. A despreader 801 despreads a baseband signal with the spreading code used to spread the signal indicating the error rate, and outputs the resulting signal to the error rate detection section 802. The error rate detection section 802 demodulates the output signal from the despreader 801 and extracts the signal indicating the error rate, and detects the error rate of the data-part signal in each communication terminal for each communication mode.

A despreader 615, demodulator 616, despreader 801, and error rate detection section 802 are provided for each communication terminal. A CIR signal for each communication terminal is output from the corresponding demodulator 616, and the data-part signal error rate is detected by the respective error rate detection section 802 for each communication terminal and for each communication mode.

A table rewriting section 803 compares the error rate detected by the error rate detection section 802 with a predetermined error rate threshold value, and rewrites the contents of the communication mode table 603 for the relevant communication terminal based on the result of this comparison.

Next, the operation of a base station with the above configuration will be described.

A signal indicating the error rate transmitted from a communication terminal is demodulated by the error rate detection section 802. By this means the data-part signal error rate is detected. The detected error rate is output to the table rewriting section 803.

Then, in the table rewriting section 803, the error rate detected by the error rate detection section 802 is compared with a predetermined threshold value, and the contents of the communication mode table 603 for the relevant communication terminal are rewritten based on the result of this comparison. The table rewriting section 603 rewrite operation by the table rewriting section 803 is as described in Embodiment 2 above, and so a description of this operation will be omitted here.

Thus, according to this embodiment, in the same way as in above-described Embodiment 2, the contents of a communication mode table indicating the correspondence between downlink channel quality and communication modes are rewritten based on the data-part signal error rate notified by a communication terminal, thereby enabling the same kind of effect to be obtained as with above-described Embodiment 2.

(Embodiment 6)

A communication terminal according to Embodiment 6 of the present invention rewrites the contents of a communication mode table indicating the correspondence between downlink channel quality and communication modes based on data-part signal throughput notified by a communication terminal.

Figure 11:
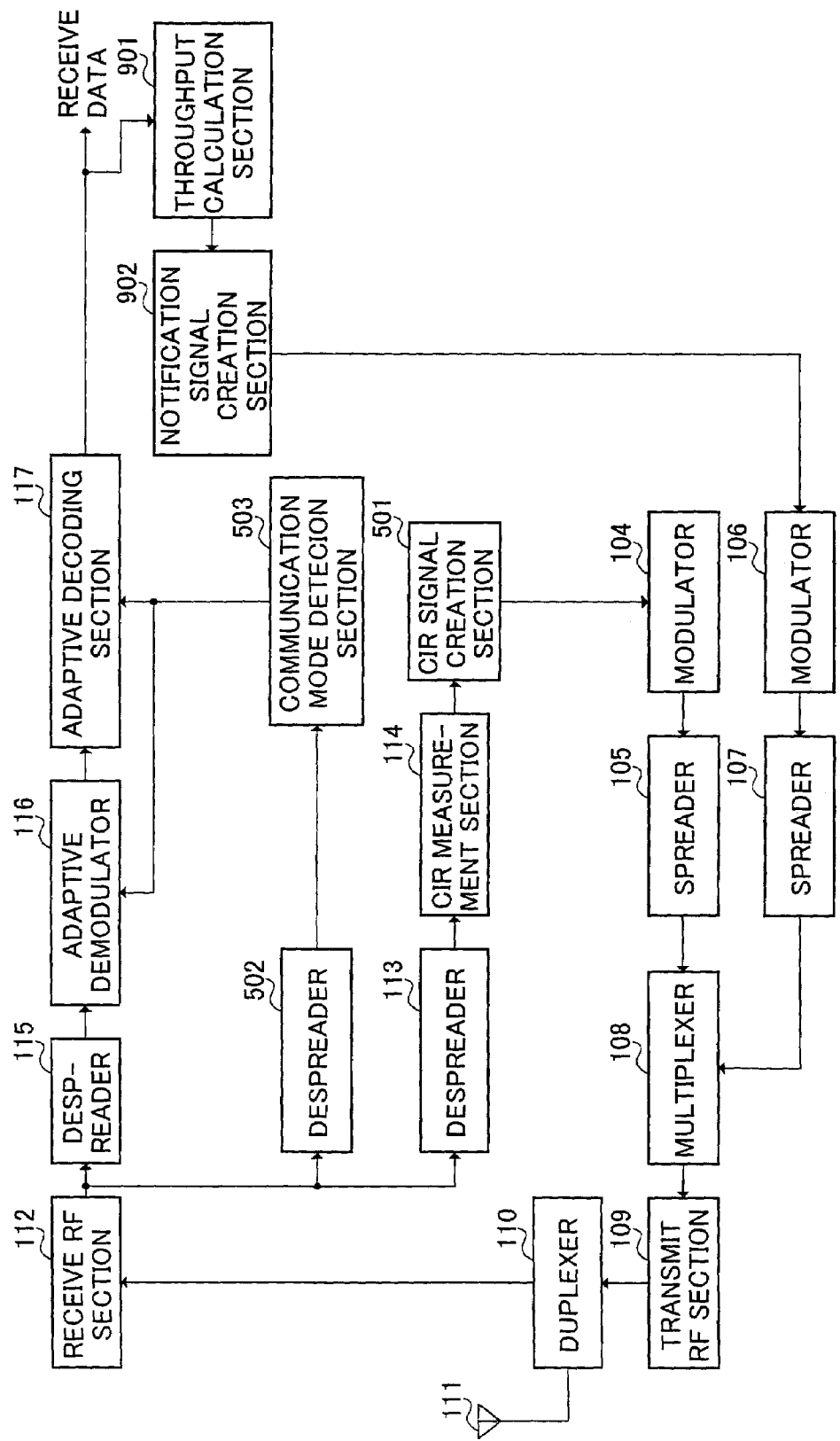
FIG. 11 is a block diagram showing the configuration of a communication terminal that performs radio communication with a base station according to Embodiment 6 of the present invention.

A base station according to this embodiment will be described below. FIG. 11 is a block diagram showing the configuration of a communication terminal that performs radio communication with a base station according to Embodiment 6 of the present invention. In the following description, parts identical to those in FIG. 7 are assigned the same codes as in FIG. 7 and their detailed explanations are omitted.

In FIG. 11, a throughput calculation section 901 calculates the average throughput of the data-part signal output from an adaptive decoding section 117 at predetermined intervals, and outputs this to a notification signal creation section 902. The method of calculating the average throughput is as described in Embodiment 3 above, and so a description of this method will be omitted here.

The throughput calculation section 901 creates a signal indicating the average throughput and outputs this signal to a modulator 106. The signal indicating the average throughput is modulated by modulator 106, spread by a spreader 107, multiplexed with a CIR signal by a multiplexer 108, and transmitted to the base station.

Figure 12:
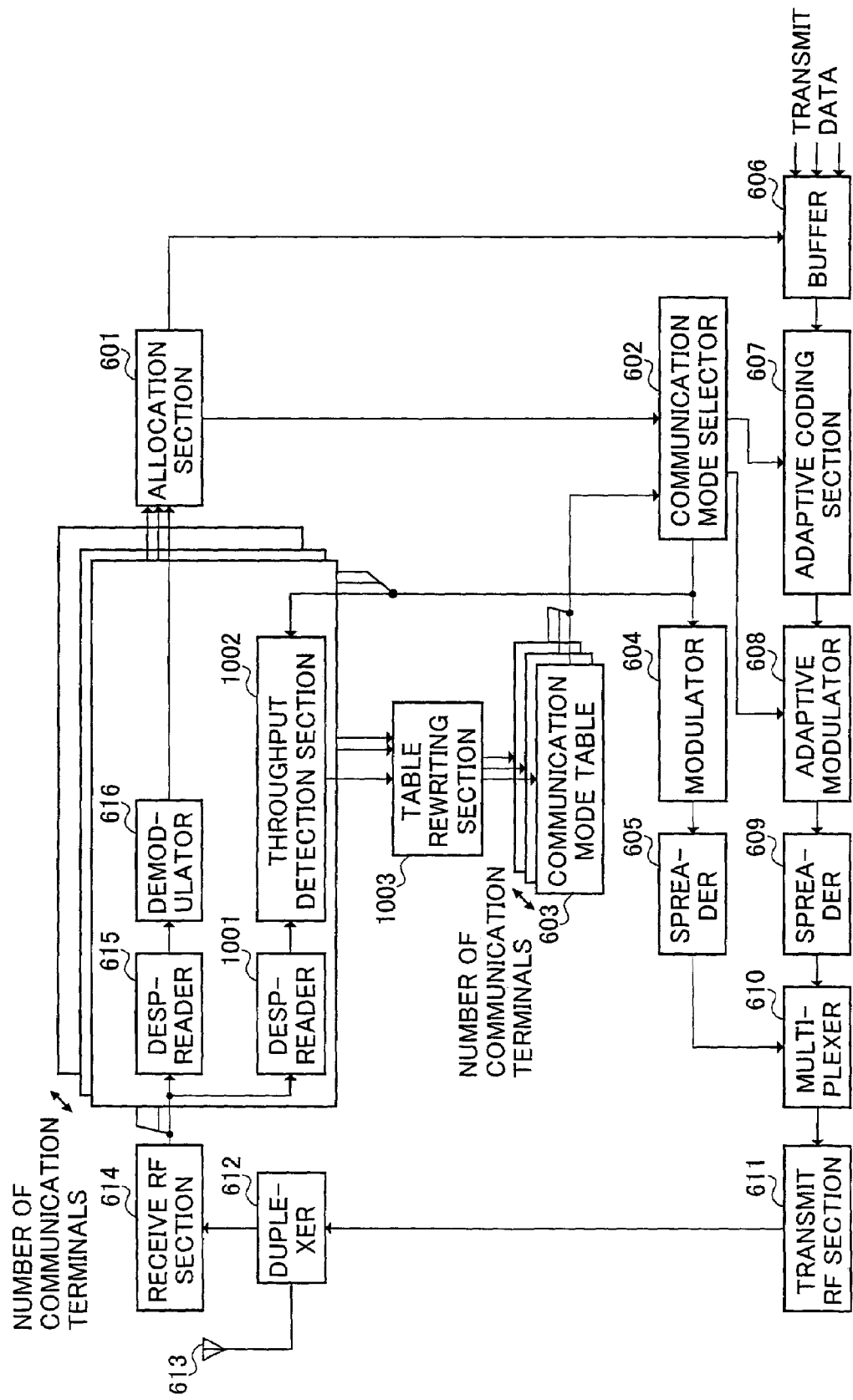
FIG. 12 is a block diagram showing the configuration of a base station according to Embodiment 6 of the present invention.

FIG. 12 is a block diagram showing the configuration of a base station according to Embodiment 6 of the present invention. In the following description, parts identical to those in FIG. 8 are assigned the same codes as in FIG. 8 and their detailed explanations are omitted.

In FIG. 12, a communication mode selector 602 outputs a signal indicating the selected communication mode to a modulator 604 and throughput detection section 1002. A despreader 1001 despreads a baseband signal with the spreading code used to spread the signal indicating the average throughput, and outputs the resulting signal to the throughput detection section 1002. The throughput detection section 1002 demodulates the output signal from the despreader 1001 and extracts the signal indicating the average throughput, and detects the average throughput of the data-part signal in each communication terminal for each communication mode.

A despreader 615, demodulator 616, despreader 1001, and throughput detection section 1002 are provided for each communication terminal. A CIR signal for each communication terminal is output from the corresponding demodulator 616, and the data-part signal average throughput is detected by the respective throughput detection section 1002 for each communication terminal and for each communication mode.

A table rewriting section 1003 compares the average throughput detected by the throughput detection section 1002 with a predetermined throughput threshold value, and rewrites the contents of the communication mode table 603 for the relevant communication terminal based on the result of this comparison.

Next, the operation of a base station with the above configuration will be described.

A signal indicating the average throughput transmitted from a communication terminal is demodulated by the throughput detection section 1002. By this means the data-part signal average throughput is detected. The detected average throughput is output to the table rewriting section 1003.

Then, in the table rewriting section 1003, the average throughput detected by the throughput detection section 1002 is compared with a predetermined threshold value, and the contents of the communication mode table 603 for the relevant communication terminal are rewritten based on the result of this comparison. The table rewriting section 603 rewrite operation by the table rewriting section 1003 is as described in Embodiment 3 above, and so a description of this operation will be omitted here.

Thus, according to this embodiment, in the same way as in above-described Embodiment 3, the contents of a communication mode table indicating the correspondence between downlink channel quality and communication modes are rewritten based on data-part signal throughput notified by a communication terminal, thereby enabling the same kind of effect to be obtained as with above-described Embodiment 3.

In above-described Embodiments 1 to 6, the CIR of a pilot signal is used as a value indicating downlink channel quality, but this is not a limitation, and any value may be used as long as it is a value that indicates channel quality.

Also, in above Embodiments 1 to 6, in order to prevent the communication mode table from being rewritten frequently, a threshold value given a predetermined width may be set as the threshold value to be compared with the number of retransmissions, error rate, or average throughput. For example, it is possible to set two new threshold values incremented/decremented by ±X with respect to the threshold value used in above Embodiments 1 to 6, and to arrange for rewriting of the communication mode table not be performed if the number of retransmissions, error rate, or average throughput is within a range of ±X with respect to the threshold value used in above Embodiments 1 to 6.

Moreover, in above Embodiments 1 to 6, a threshold value to be compared with the number of retransmissions, error rate, or average throughput may be set for each communication mode.

Furthermore, in above Embodiments 1 to 3, a communication terminal may be notified by the base station of the threshold value to be compared with the number of retransmissions, error rate, or average throughput.

In addition, in above Embodiments 1 to 6, all the CIR values set in the communication mode table are rewritten when the communication mode table is rewritten, but a particular CIR value or plurality of CIR values may be rewritten instead.

Also, in above Embodiments 1 to 6, the variation widths of the CIR values set in the communication mode table are assumed to be fixed values (X [dB], Y [dB], and Z [dB]), but it is also possible for variation widths to be varied adaptively according to the size of the difference between the measured channel quality and the current actual channel quality.

Moreover, in above Embodiments 1 to 6, the fact that a difference has arisen between the measured channel quality and the current actual channel quality is detected on the basis of data-part signal channel quality, but this is not a limitation, and any method may be used as long as it is a method that can detect the fact that a difference has arisen.

Thus, according to above Embodiments 1 to 6, in a communication system in which communication resources are allocated to communication terminals by time division based on downlink channel quality measured from a pilot signal, the correspondence between downlink channel quality and communication modes is rewritten when a difference arises between the measured channel quality and the current actual channel quality, thereby making it possible to select a communication mode that enables communication to be performed most efficiently with the current actual channel quality. Thus, according to the present invention, it is possible to prevent a fall in downlink throughput.

(Embodiment 7)

Figure 13:
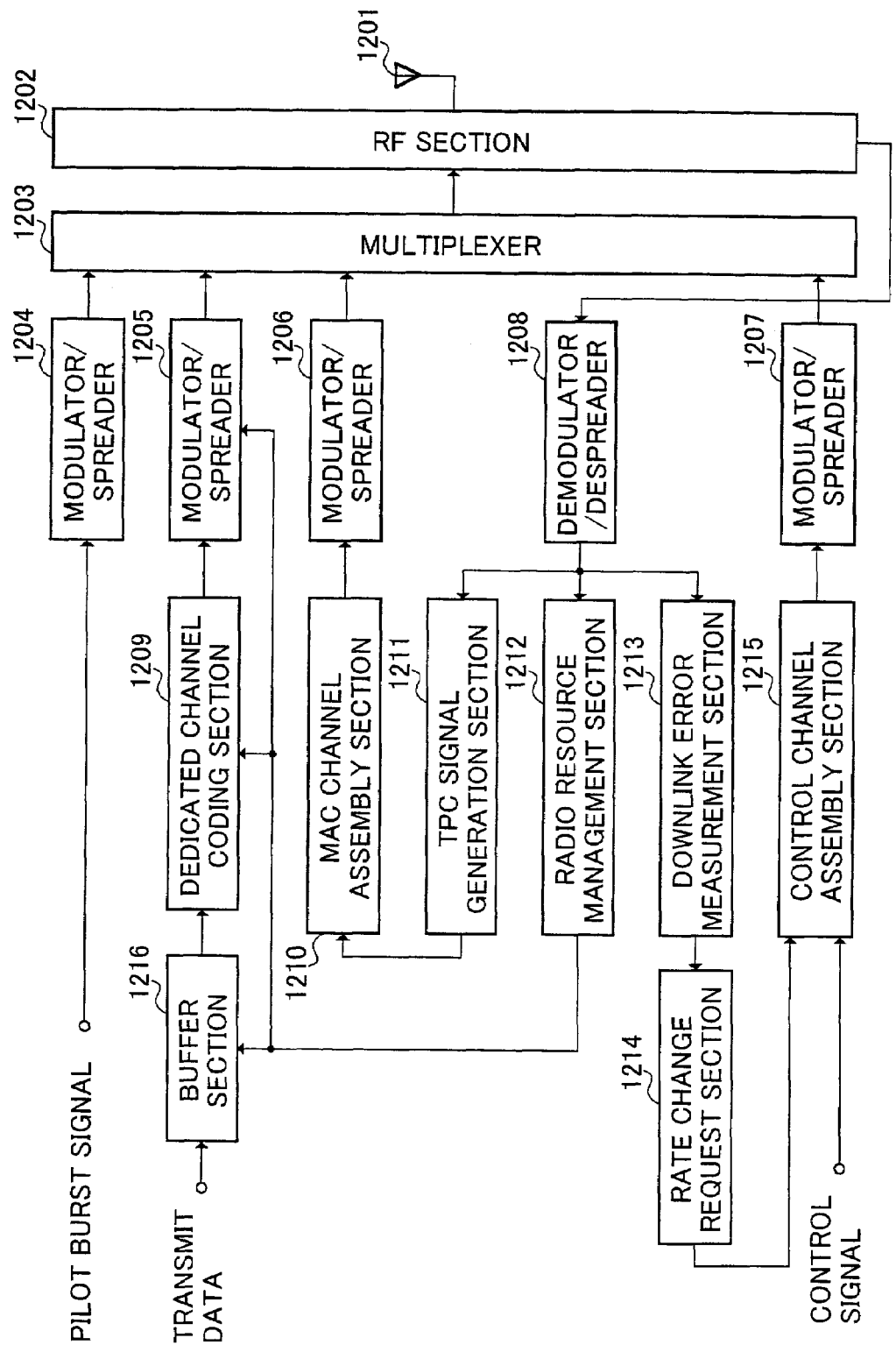
FIG. 13 is a block diagram showing the configuration of a base station according to Embodiment 7 of the present invention.
Figure 14:
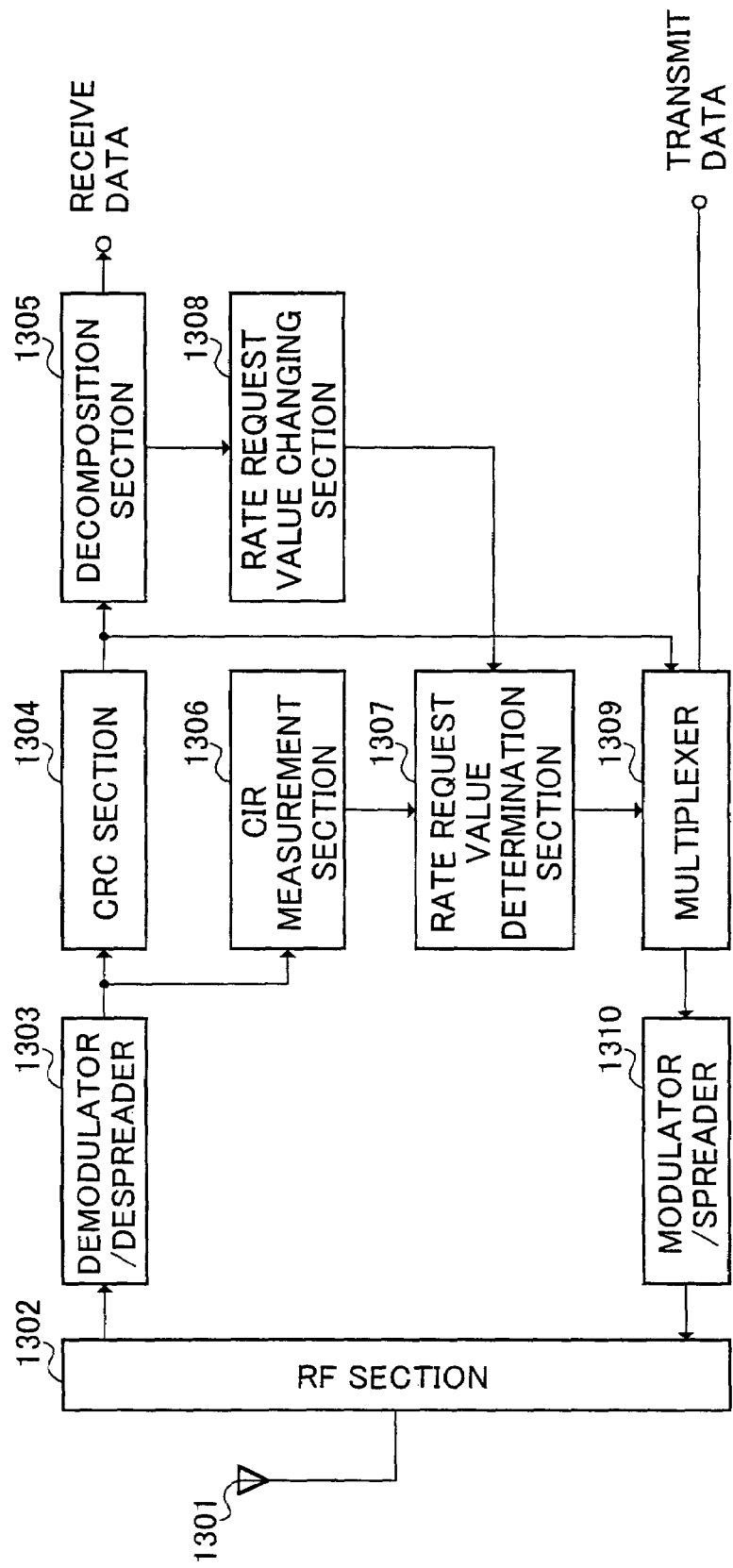
FIG. 14 is a block diagram showing the configuration of a communication terminal according to Embodiment 7 of the present invention.

FIG. 13 is a block diagram showing the configuration of a base station according to Embodiment 7 of the present invention, and FIG. 14 is a block diagram showing the configuration of a communication terminal according to Embodiment 7 of the present invention.

First, in a modulator/spreader 1204 of the base station shown in FIG. 13, a pilot burst signal is modulated and then spread. This spread pilot burst signal is multiplexed with other signals by a multiplexer 1203, and the resulting signal undergoes predetermined transmission processing such as up-conversion by an RF section 1202, and is then transmitted from an antenna 1201.

This signal is received by the antenna 1301 of the communication terminal shown in FIG. 14, undergoes predetermined reception processing such as down-conversion by an RF section 1302, and is then output to a despreader/demodulator 1303. In the despreader/demodulator 1303, the received signal is despread and then demodulated, and is output to a CRC section 1304 and CIR measurement section 1306.

In the CIR measurement section 1306, the reception quality to be specific, the CIR of the pilot burst signal in the demodulated received signal is measured. The measured CIR is output to a rate request value determination section 1307. The correspondence between CIRs and transmission rates has been stored beforehand in the rate request value determination section 1307, and the transmission rate corresponding to the measured CIR is selected by the CIR measurement section 1306. This selected transmission rate is then output to a multiplexer 1309 as the rate request value of this terminal.

In the multiplexer 1309, the rate request value and transmit data from this terminal are multiplexed, and this multiplex signal is modulated and then spread by a modulator/spreader 1310. This spread signal undergoes predetermined transmission processing by the RF section 1302, and is then transmitted from the antenna 1301.

This signal is received by the antenna 1201 of the base station shown in FIG. 13, undergoes predetermined reception processing by the RF section 1202, and is then output to a despreader/demodulator 1208. In the despreader/demodulator 1208, the received signal is despread and then demodulated, and is output to a TPC signal generation section 1211 and radio resource management section 1212.

In the TPC signal generation section 1211, a TPC signal for controlling terminal transmission power is generated using a pilot symbol included in the demodulated signal. This TPC signal is assembled into a MAC channel signal by a MAC channel assembly section 1210. The MAC channel signal is modulated and then spread by a modulator/spreader 1206, and is output to the multiplexer 1203.

In the radio resource management section 1212, the communication terminal that transmitted the largest rate request value among the rate request values from all the communication terminals is selected, and the result of this selection is output to a buffer section 1216, dedicated channel coding section 1209, and modulator/spreader 1205. The selection method may also be to select the communication terminal that requested the lowest transmission rate, so that communication is possible for all communication terminals. There are no particular restrictions on the selection method.

Transmit data for this selected communication terminal is read in the buffer section 1216. Then, in the dedicated channel coding section 1209, address information indicating which communication terminal this transmit data is destined for is added to this read transmit data. Then the data with address information added is modulated and then spread by modulator/spreader 1205, and is output to the multiplexer 1203. Each of the signals output to multiplexer 1203 is multiplexed and then transmitted from the RF section 1202 via the antenna 1201.

When this signal is received by the communication terminal shown in FIG. 14, if address information for this terminal is received, the signal following the address information is received. Then a CRC is performed on the receive data by the CRC section 1304. If the result of this CRC is OK, the receive data is output via a decomposition section 1305 to a latter-stage circuit (not shown). If the result of this CRC is NG, on the other hand, the receive data is not output to the decomposition section 1305. The CRC result (OK or NG) is transmitted to the base station shown in FIG. 13 via the multiplexer 1309, modulator/spreader 1310, RF section 1302, and antenna 1301.

When this CRC result (OK or NG) is received by the base station shown in FIG. 13, it is input to a downlink error measurement section 1213. In the downlink error measurement section 1213, the error rate of signal transmission to the communication terminal is estimated from this CRC result, and this error rate is output to a rate change request section 1214.

Estimation of the error rate is performed as follows. The number of NGs within a predetermined interval is counted for each communication terminal and for each allocated data rate. Similarly, the number of times allocated is counted. Then the result of dividing the number of NGs by the number of times allocated is taken as the error rate estimate.

In the rate change request section 1214, the error rate is compared with a predetermined first threshold value and a predetermined second threshold value. It is assumed that the second threshold value is a lower value than the first threshold value. It is also assumed that the second threshold value is greater than zero and almost zero.

Then, in the rate change request section 1214, if the error rate is outside the predetermined range—that is, greater than or equal to the first threshold value or less than or equal to the second threshold value—it is determined that the transmission rate determined from the CIR by the rate request value determination section 1307 is incorrect. That is to say, it is determined that the rate request value from the communication terminal is incorrect.

In other words, in the rate change request section 1214, if the error rate is greater than or equal to the first threshold value, it is determined that the rate request value is too high and the desired communication quality cannot be attained at that transmission rate. In this case, therefore, a signal instructing the communication terminal to lower the rate request value below the transmission rate determined from the CIR is generated by the rate change request section 1214 as a rate change instruction signal. In this way the base station can cause the transmission rate requested by the communication terminal to be changed to a transmission rate that meets the desired communication quality.

If, on the other hand, the error rate is less than or equal to the second threshold value, it is determined that the rate request value from the communication terminal is too low and communication quality is excessive at that transmission rate. In this case, therefore, a signal instructing the communication terminal to raise the rate request value above the transmission rate determined from the CIR is generated by the rate change request section 1214 as a rate change instruction signal. In this way the base station can cause the transmission rate requested by the communication terminal to be changed to a transmission rate at which data communication can be performed more efficiently.

Determination and rate change instruction operations performed by the rate change request section 1214 may be divided between two component sections (a determination section and a changing section).

A rate change instruction signal generated by the rate change request section 1214 is assembled into a control channel signal by a control channel assembly section 1215. The control channel signal is modulated and then spread by a modulator/spreader 1207, and transmitted from the RF section 1202 via the multiplexer 1203.

When this control channel signal is received by the communication terminal shown in FIG. 14, the signal undergoes a CRC by the CRC section 1304, and if the result is OK, is output to the decomposition section 1305. In the decomposition section 1305, the control channel signal is decomposed and the rate change instruction signal extracted, and the extracted rate change instruction signal is output to a rate request value changing section 1308.

A rate request value change instruction is issued by the rate request value changing section 1308 to the rate request value determination section 1307 in accordance with the rate change instruction signal. In the rate request value determination section 1307, the rate request value is changed in accordance with this instruction. That is to say, if the instruction given by the rate change instruction signal is an instruction to lower the rate request value, the rate request value is lowered below the transmission rate determined from the CIR, and, conversely, if the instruction given by the rate change instruction signal is an instruction to raise the rate request value, the rate request value is raised above the transmission rate determined from the CIR. In this way it is possible for a transmission rate request value determined by a communication terminal to be changed by that communication terminal in accordance with an instruction from the base station.

Thus, according to this embodiment, if the error rate is outside a predetermined range, a base station determines that the transmission rate requested by a communication terminal is incorrect and instructs the communication terminal to change the transmission rate request value, and the communication terminal changes the transmission rate request value in accordance with that instruction. By this means it is possible for the transmission rate used for data transmission from the base station to a communication terminal to be made a transmission rate that enables the desired communication quality to be attained. In other words, the transmission rate value can be made a value that enables data transmission to be performed appropriately. Thus, appropriate data transmission can be performed, and communication failures can be eliminated.

As described above, according to the present invention it is possible to prevent a fall in downlink throughput in a communication system in which communication resources are allocated to communication terminals by time division based on downlink channel quality measured from a pilot signal.

This application is based on Japanese Patent Application No. 2000-232269 filed on Jun. 26, 2000, and Japanese Patent Application No. 2000-249554 filed on Aug. 21, 2000, entire content of which is expressly incorporated by reference herein.

The invention claimed is:

1. A base station apparatus comprising:
an estimator that estimates an error rate of reception data in a communication terminal apparatus;
a transmission rate changer that, when the estimated error rate is greater than or equal to an upper limit value of a predetermined range, generates a signal to instruct the communication terminal apparatus to lower a transmission rate; and
a transmitter that transmits the generated signal to the communication terminal apparatus.

2. The base station apparatus according to claim 1, wherein the estimator estimates the error rate using CRC results of the reception data in the communication terminal apparatus.

3. The base station apparatus according to claim 2, wherein the estimator finds a value of the estimated error rate by dividing the number of NGs in the CRC results by the number of times the transmission rate is allocated.

4. A base station apparatus comprising:
an estimator that estimates an error rate of reception data in a communication terminal apparatus;
a transmission rate changer that, when the estimated error rate is less than or equal to a lower limit value of a predetermined range, generates a signal to instruct the communication terminal apparatus to raise a transmission rate; and
a transmitter that transmits the generated signal to the communication terminal apparatus.

5. The base station apparatus according to claim 4, wherein the estimator estimates the error rate using CRC results of the reception data in the communication terminal apparatus.

6. The base station apparatus according to claim 5, wherein the estimator finds a value of the estimated error rate by dividing the number of NGs in the CRC results by the number of times the transmission rate is allocated.

7. A radio communication method comprising:
estimating an error rate of reception data in a communication terminal apparatus;
generating a signal to instruct the communication terminal apparatus to lower a transmission rate, when the estimated error rate is greater than or equal to an upper limit value of a predetermined range; and
transmitting the generated signal to the communication terminal apparatus.

8. A radio communication method comprising:
estimating an error rate of reception data in a communication terminal apparatus;
generating a signal to instruct the communication terminal apparatus to raise a transmission rate, when the estimated error rate is less than or equal to a lower limit value of a predetermined range; and
transmitting the generated signal to the communication terminal apparatus.

* * * * *